(12) United States Patent
Said (10) Patent No.: US 7,730,412 B2
(45) Date of Patent: Jun. 1, 2010

(54) SYSTEM AND METHOD FOR MODEL-BASED USER INTERFACE USING TRANSFORMATION NODES

(75) Inventor: Baré Said, St. Leon-Rot (DE)

(73) Assignee: SAP AG, Walldorf (DE)

( * ) Notice: Subject to any disclaimer, the term of this patent is extended or adjusted under 35 U.S.C. 154(b) by 384 days.

(21) Appl. No.: 11/428,013

(22) Filed: Jun. 30, 2006

(65) Prior Publication Data

US 2008/0005623 A1    Jan. 3, 2008

(51) Int. Cl.
*G06F 3/00* (2006.01)
(52) U.S. Cl. ...................................... 715/762; 715/763
(58) Field of Classification Search .......... 715/762–763
See application file for complete search history.

(56) References Cited

U.S. PATENT DOCUMENTS

| | | | |
|---|---|---|---|
| 6,407,761 B1 * | 6/2002 | Ching et al. ................. 715/835 |
| 6,493,714 B1 | 12/2002 | Beaven et al. |
| 6,496,202 B1 * | 12/2002 | Prinzing ..................... 715/762 |
| 7,424,485 B2 * | 9/2008 | Kristiansen et al. ......... 707/102 |
| 7,526,759 B2 * | 4/2009 | Sanjar et al. ................. 717/135 |
| 2002/0161734 A1 * | 10/2002 | Stauber et al. ................. 707/1 |
| 2003/0078677 A1 * | 4/2003 | Hull et al. ...................... 700/1 |
| 2003/0120675 A1 * | 6/2003 | Stauber et al. ............. 707/100 |
| 2006/0004845 A1 * | 1/2006 | Kristiansen et al. ..... 707/103 R |
| 2006/0036634 A1 * | 2/2006 | Kristiansen et al. ......... 707/102 |
| 2006/0228654 A1 * | 10/2006 | Sanjar et al. ................. 430/438 |
| 2006/0229994 A1 * | 10/2006 | Moulckers et al. ............ 705/59 |
| 2007/0179793 A1 * | 8/2007 | Bagchi et al. .................. 705/1 |
| 2007/0239470 A1 * | 10/2007 | Ronen et al. ................... 705/1 |

* cited by examiner

*Primary Examiner*—Ting Lee
*Assistant Examiner*—Ashraf Zahr
(74) *Attorney, Agent, or Firm*—Kenyon & Kenyon LLP (57) ABSTRACT

Methods and systems to include transformation nodes in a business system are provided. A transformation node may provide controlled redundancy of data within the business object hierarchy. Transformation nodes may store data from core nodes without persistency, and permit different data presentation modes than for the core nodes. When a service call is placed to a transformation node, the transformation node may call corresponding services from associated core nodes.

13 Claims, 8 Drawing Sheets

SYSTEM AND METHOD FOR MODEL-BASED USER INTERFACE USING TRANSFORMATION NODES

BACKGROUND

Computer-based business systems often contain many business objects to store data and perform business functions. Each business object may expose one or more services to a user interface, such as services to create or update entities managed by the business object. For example, a business object for storing and manipulating purchase orders may expose services allowing for the creation of new purchase orders, modification of previously-created purchase orders, and other similar functions. The services exposed by a business object may be represented as a hierarchy of nodes.

Business objects are designed to be redundancy-free so that specific content, such as an address, telephone number, etc., only occurs once in the business object. A user interface can discover the services available from various business objects and applications by querying a service layer. The service layer interacts with business objects to identify what services are available for each business object, and returns information about the services to the user interface. Model-driven user interfaces therefore do not include functionality coded therein; instead, all functionality in the user interface is derived from the service layer and business objects. When a service is invoked via the user interface, service providers in the backend applications implement the appropriate service.

Although this structure permits the user interface to reflect the structure of each business object, it does not allow for structural differences between the user interface and the backend database or business object. That is, since the user interface renders data only as presented by the business object, it does not allow for variations in the presentation of data and services. For example, model-driven interfaces generally are unable to display the same data in multiple formats. Also, it may be difficult to present highly-sophisticated user interfaces since the rendered data must be directly related to the services exposed by each business object.

DETAILED DESCRIPTION

The present invention provides systems and methods to include "transformation nodes" in a business system. A transformation node may provide controlled redundancy of data within the business object hierarchy. Transformation nodes may be flagged or otherwise designated in the business object to distinguish them from "core nodes." Core nodes store data elements and functions on which the business processes rely. Transformation nodes may store data from core nodes without persistency, and permit different data presentation modes than for the core nodes. A transformation node may also have associated services in the backend application. However, when a service is invoked, the service for the transformation node may call corresponding services from associated core nodes, which perform the requested operations.

In some applications, it may be desirable to have a certain amount of redundancy in the user interface. For example, it may be useful to provide alternate interfaces for a user to enter the same data, such as a date or date range. In a standard model-driven user interface, the user is only presented with fields corresponding to database entries. A transformation node may allow this sort of redundancy in the user interface, without requiring corresponding redundancy in the backend databases or business objects. For example, where the same information is to be displayed in multiple ways in the user interface, the information can be displayed using transformation nodes instead of being stored in multiple forms and later displayed via a standard model-driven user interface.

Transformation nodes may avoid inconsistencies in the user interface or stored data that could result from this controlled redundancy by synchronizing the various redundant interfaces created by the transformation nodes. The same data and services may be displayed simultaneously on multiple user interfaces. When data is updated or a service called in one interface, the transformation nodes are notified. The transformation nodes can then send notifications to other user interfaces displaying the same data and/or services, instigating a refresh of the information displayed in each interface. Information therefore may be consistently displayed across all appropriate user interfaces.

In an embodiment, service requests may be made via core nodes or transformation nodes. For example, a user interface might include an element that exposes a service of a core node, and an element that exposes a service of a transformation node. When a user generates a request using a user interface element, the request is sent to the node associated with the interface element used to generate the request.

Figure 1:
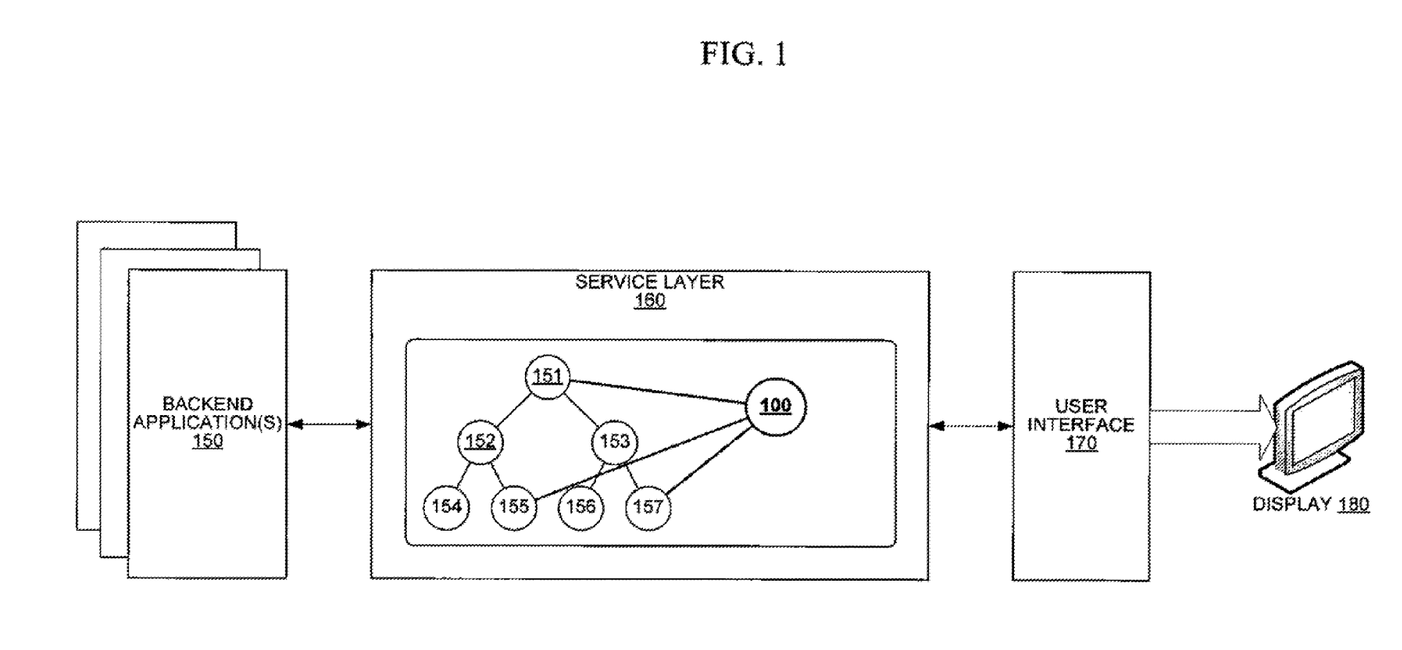
FIG. 1 shows a business system and user interface implementing transformation nodes according to an embodiment of the present invention.

FIG. 1 shows a business system and user interface implementing transformation nodes according to an embodiment of the present invention. One or more backend applications 150 are present in the business system. The applications may be stored and executed on one or more servers in communication with a user interface 170 displayed on a terminal or other display 180. Various network topologies and protocols may be used to enable communication between the business system and the user interface. The specific arrangement and topology of servers, applications, systems, communication protocols, and connections are irrelevant to the present discussion unless specified otherwise herein.

The user interface 170 may access the backend applications 150 via a service layer 160. Each business object in the system may be associated with one or more services, represented in FIG. 1 as a hierarchy of core nodes 151-157. Each core node 151-157 represents a single service exposed by the business object. In an embodiment, services are only executed by the core nodes and related service providers.

A transformation node 100 may present different services and user interface functionality than the core nodes 151-157. The services and functionality exposed by the transformation node 100 are based on and associated with services exposed by specific core nodes 151, 155, 157. When the transformation node 100 receives a request to a service implemented by the transformation node, the request is translated and/or redirected to the appropriate services implemented by the core nodes 151, 155, 157.

Figure 2:
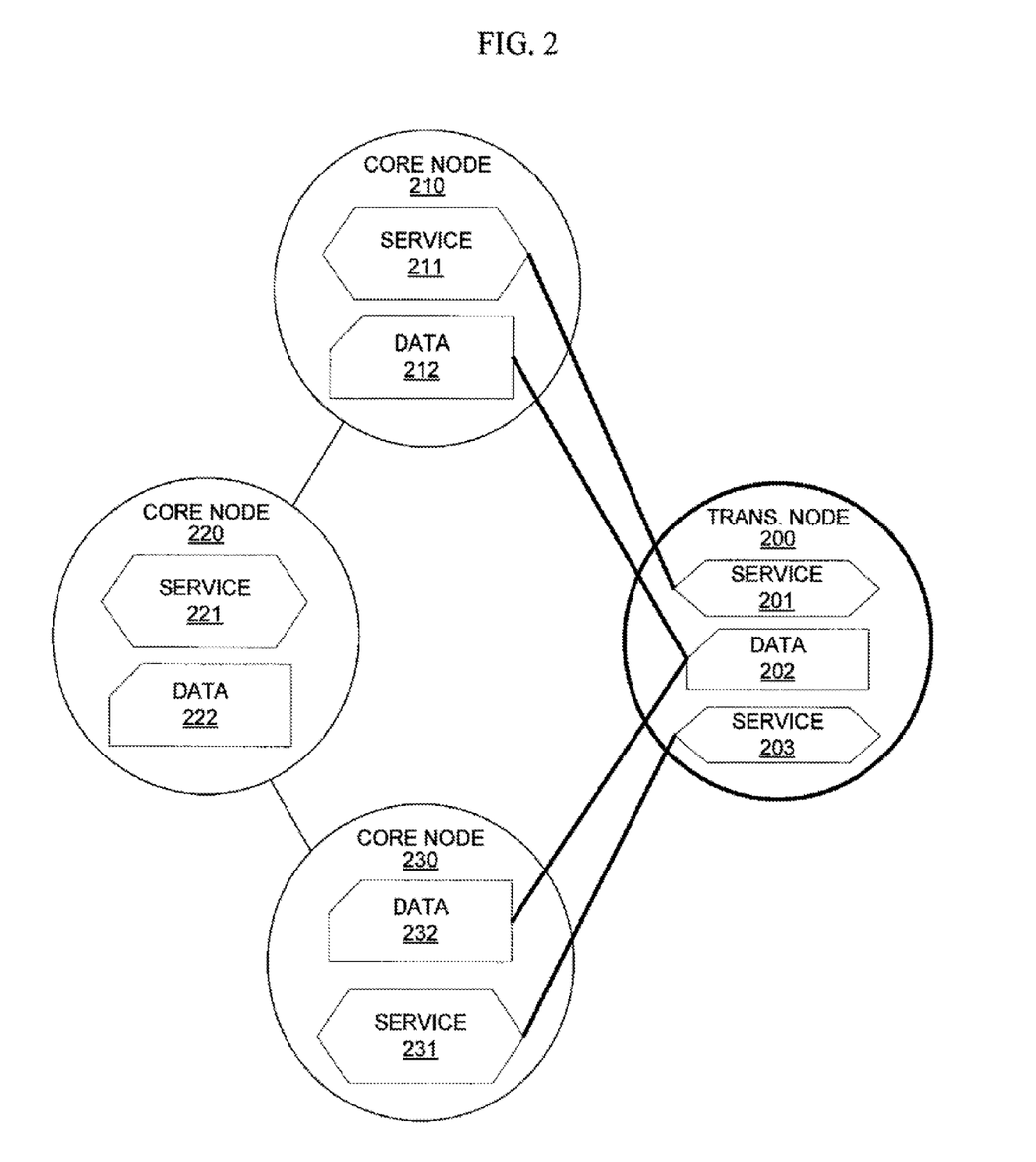
FIG. 2 shows core nodes and a transformation node according to an embodiment of the present invention.

FIG. 2 illustrates a transformation node 200 that reads data and services from two core nodes 210, 230. A transformation node 200 may not use all the core nodes in the hierarchy. For example, in FIG. 2 the transformation node does not use one of the exemplary core nodes 220. Each core node 210, 220, 230 includes data 212, 222, 232 and services 211, 221, 231, respectively. The transformation node reads data and services from the core nodes. Based on a set of transformation rules stored in the business object, the transformation node 200 compiles the data into a presentation format appropriate for a user interface. The transformation node may offer representations of data and services that are different from those exposed by the core nodes. That is, the transformation node may provide different formats and/or presentation modes than those provided by the core nodes. In the example shown in FIG. 2, the transformation node 200 includes data 202 and two services 201, 203.

Because a transformation node is a business object node, a user interface need not distinguish between the transformation node and a standard core node The transformation node can thus expose data and services in a way that can be used by the user interface. Based on the services exposed by the selected core nodes, the transformation node may create services to be exposed to the user interface. These services may be direct "copies" of the original services (i.e., data will be passed directly through the transformation node service to the original service). The services may also be "new" services created by the transformation node, that can pass requests on to one or more core services The requests may be passed directly, or they may be modified before being passed to the core services. Similarly, the transformation node can select and combine various data stored in the business object. A service exposed by a transformation node may be referred to as a transformation service.

Interface information is provided to the user interface by a transformation node, which allows the user interface to present the data and call the services created in the transformation node. In general, the user interface does not distinguish between the data and services provided by a transformation node and those provided by a core node. The transformation node includes the logic and rules to map between transformation node services and core node services. For example, in FIG. 2 the transformation node 200 exposes services 201, 203 based on or referencing core services 211 and 231 respectively. These services may utilize or display a combination of data 202 derived from data 212, 232 stored in the core nodes.

Figure 3:
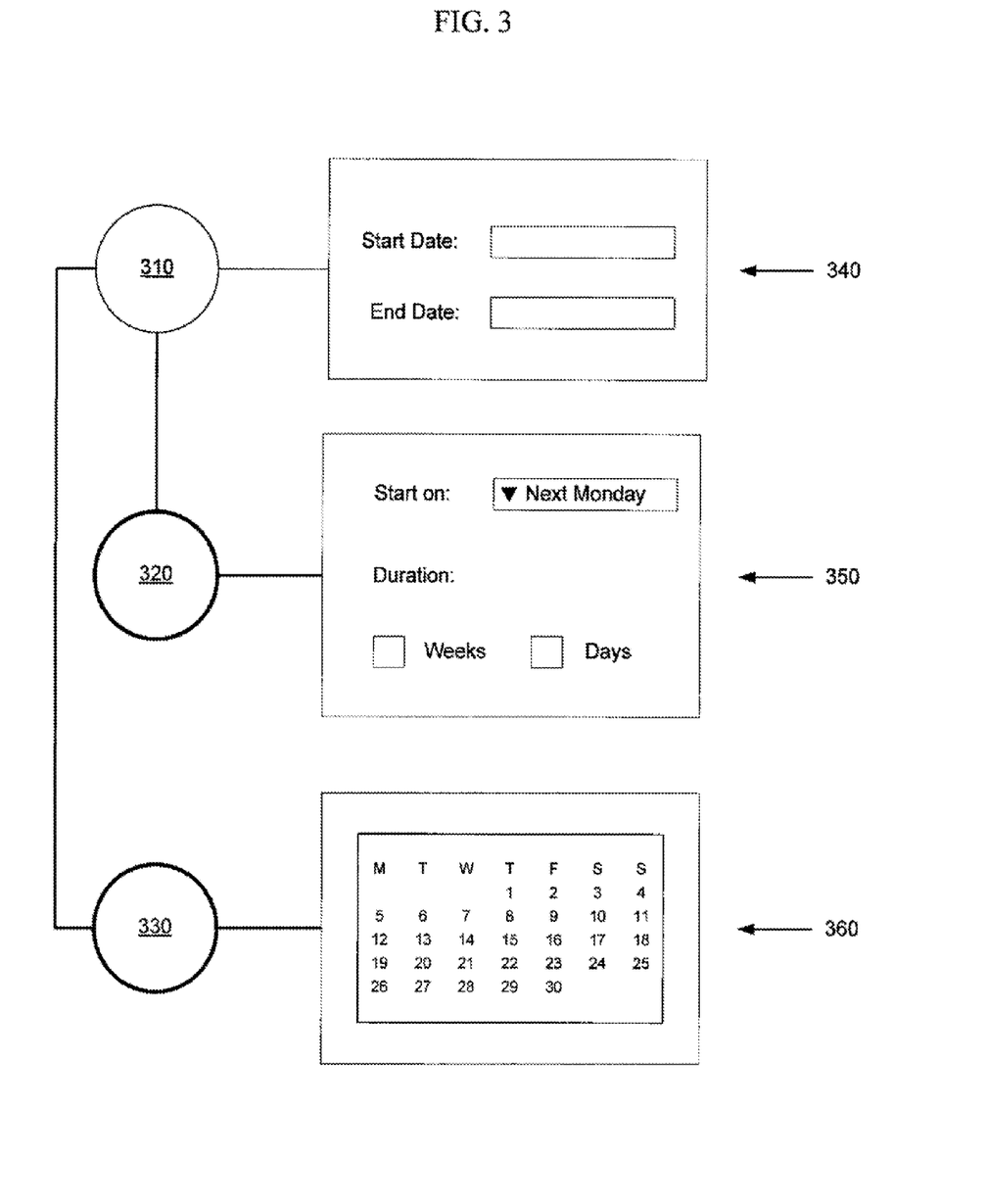
FIG. 3 shows a user interface using a core node and a transformation node according to an embodiment of the present invention.

An example of user interface elements generated from a core node and transformation nodes is shown in FIG. 3. A user interface may include multiple screens 340, 350, 360. The screens may be shown on the same display device, or they may be shown on different displays. In the example shown, each interface may be used by an employee to make a leave request. In one interface 340, the interface is mapped directly from a core node 310. The structure of the interface directly reflects the structure of data stored in the core node 310. That is, since the only information required by the core node to create and process a leave request is the start and end dates, the user is only able to enter the leave request by specifying those two dates The interface element 340 associated with the core node 310 therefore provides data entry areas for an employee to enter the start and end dates of the leave request.

A second user interface element 350 may be associated with a transformation node 320. The transformation node 320 may retrieve data and services from the appropriate core node 310. An interface element 350 may then be constructed in the user interface based on the services and data provided by the transformation node 320. The element constructed from the transformation node may provide a different presentation mode than the element constructed from the core node. In the example shown, an employee may enter a leave request by selecting the day on which the leave is to begin, such as "Next Monday," "Next Friday," etc., and the duration of the leave in weeks and days. The transformation node 320 includes logic to map between the start and end date values stored in the business object and the values shown in the interface.

Other presentation modes may be used. As another example, a second transformation node 330 allows for a "date selection" calendar 360 to be displayed in the user interface. Thus, instead of typing in the dates of a leave request as required in the core node interface 340 or selecting the leave request times as shown in the first transformation node interface 350, an employee may select, the dates from a calendar.

To prevent data errors and/or redundancy in the business system, the transformation node may provide mechanisms for synchronizing the two interface elements. For example, in the user interface shown in FIG. 3, when a user selects a date in the calendar 340 the appropriate date may be entered in the "Start Date" entry area in the other interface element 330. Each interface may display data derived from data entered by a user in one of the other interfaces. That is, data displayed in one interface 350 may be derived from another interface 340 or 360; similarly, data displayed in the "calendar" interface 360 may be derived from data entered in either of the other interfaces 340 or 350. Specific examples of the processes and communications used to maintain consistency between interface elements are described in more detail below.

Figure 4:
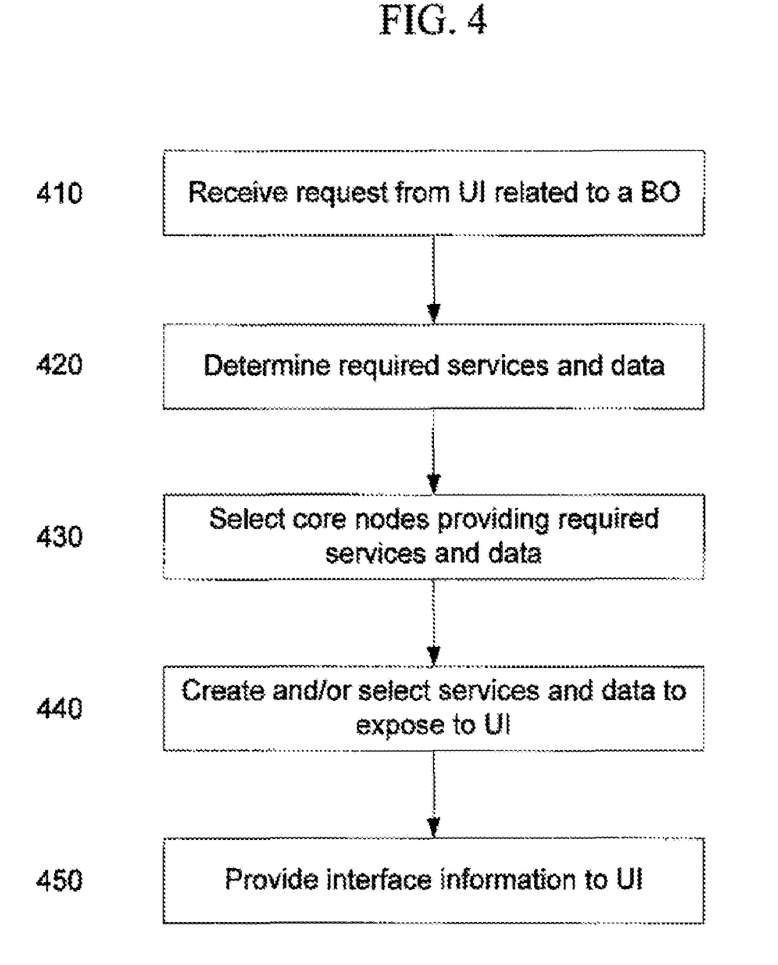
FIG. 4 shows a method used by a transformation node according to an embodiment of the present invention.

The transformation node may act as an intermediary between the core nodes of a business object and the user interface. The transformation node can select various data and services to expose to the user interface based on user input. FIG. 4 shows the basic process a transformation node might use in communication with a user interface. First, the transformation node receives a request 410 from the user interface related to a business object. For example, a user might select a function allowing for a business partner address to be updated. The transformation node then determines the services and data provided by and stored in the related business object that are necessary to complete the user request 420. Core nodes that provide the required data and services may be selected 430. The transformation node may then create and/or select services and data to expose to the user interface, based on the request received from the user and the services exposed by the selected core nodes. Finally, interface information may be provided to the user interface 450.

Figure 5:
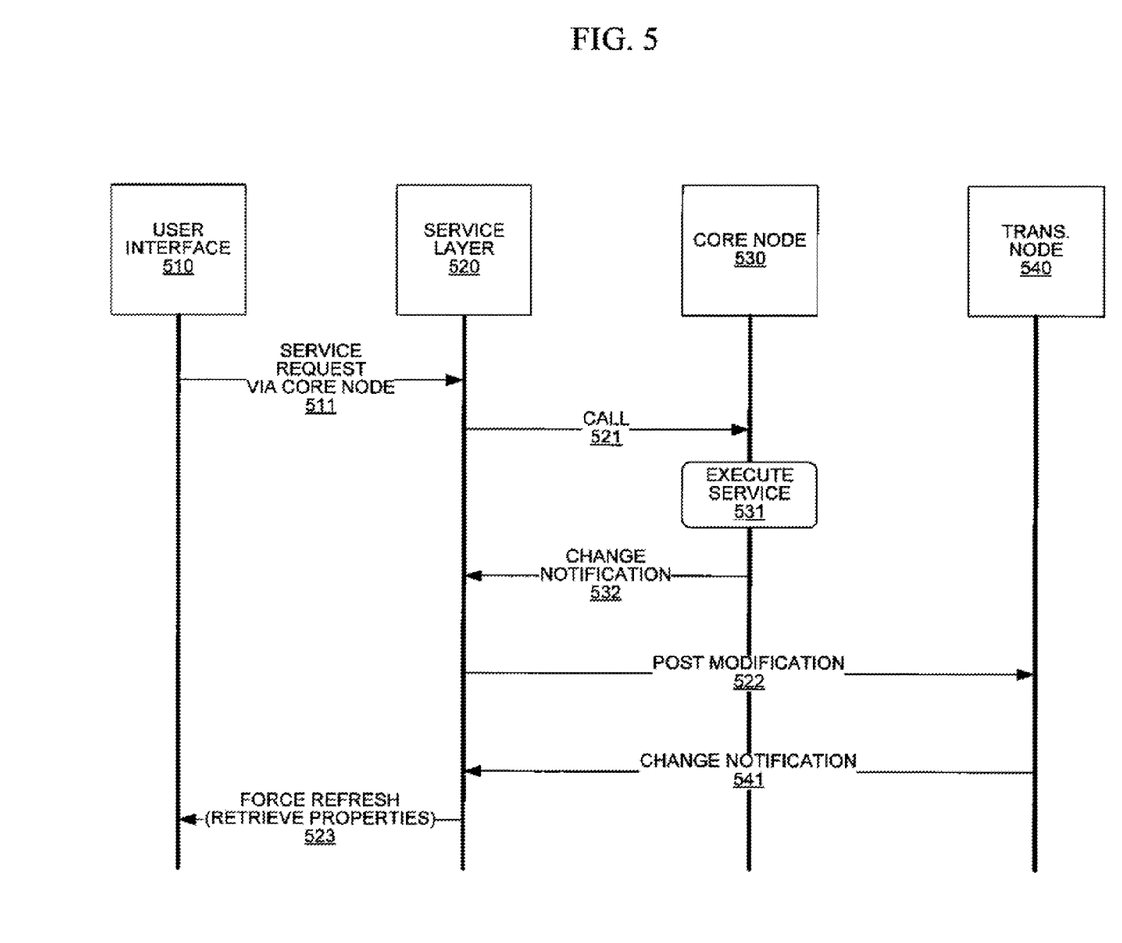
FIG. 5 shows a process for executing a service in a system implementing transformation nodes according to an embodiment of the present invention.

FIGS. 5-8 show the basic communications between nodes, the user interface, and a service layer when a transformation node is present. Referring to FIG. 5, a set of communications resulting from a user request via a core node is shown. When a user makes a service request 511 via a user interface 510, the request may be made using an element of the user interface associated with a core node. A service layer 520 may receive the request, and call the appropriate node. If the request is made using a core node interface element, the service layer may call the appropriate core node 530. The core node 530 then executes an appropriate service 531 and sends a change notification 532 to the service layer.

Since transformation nodes may introduce controlled redundancy in a user interface, there may be transformation nodes in the system which should be updated based on the service executed by the core node 530. The service layer 520 may send a notification 522 to each transformation node 540 after a core node executes a service. The transformation node may then identify which core node or nodes have changed. If the transformation node should be updated as a result of the service request, the transformation node may send a change notification 541 to the service layer. Finally, the service layer may notify 523 the user interface of which nodes should be refreshed due to completion of the service request. The user interface can then request updated data from changed nodes. Examples of the user interface refresh process are described in further detail below.

Figure 6:
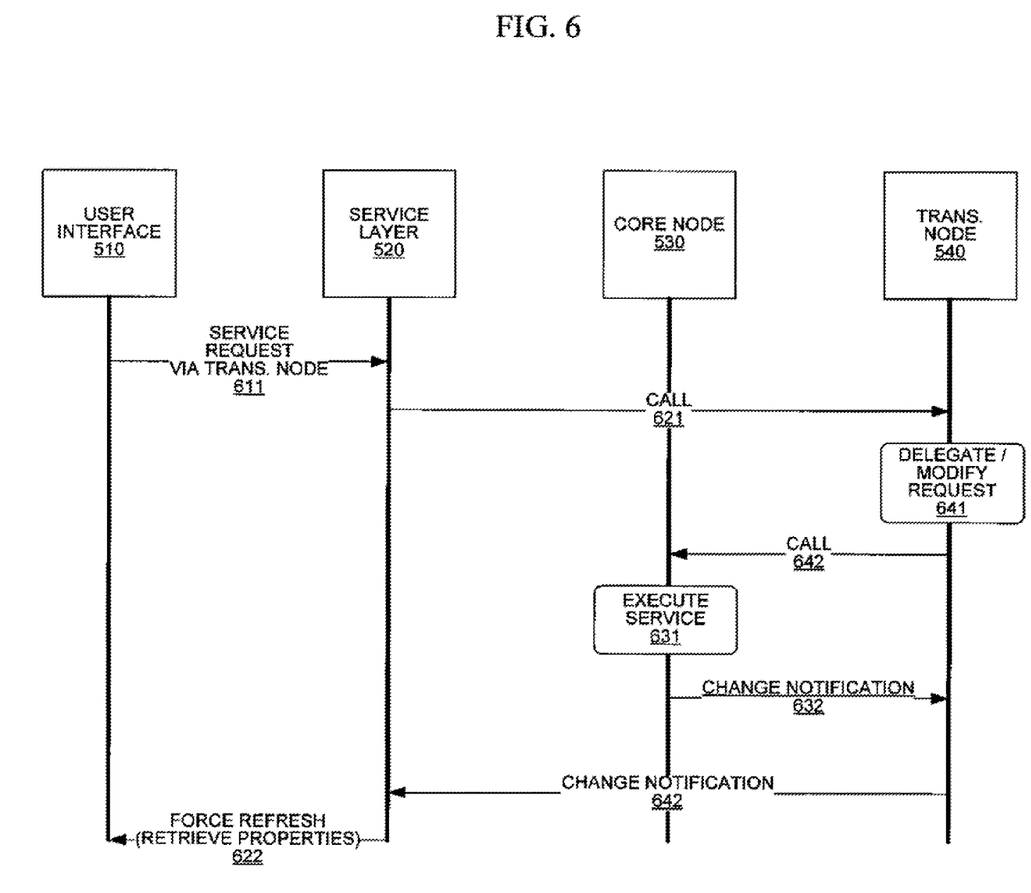
FIG. 6 shows a process for executing a service in a system implementing transformation nodes according to an embodiment of the present invention.

FIG. 6 shows a similar process where the service to be executed is implemented by a transformation node. When the service layer 420 receives a service request 611 based on a service implemented by the transformation node 540, a call 621 may be sent to the transformation node 540. The transformation node may then determine which core node or nodes 530 implement the core services necessary to perform the request. The transformation node then sends appropriate service calls 642 to the core nodes 530. A service call sent to a core node may be a redirection or copy of the original call 621 to the transformation node, or it may be a service call constructed by the transformation node based on the original service request. The core node may execute the service or services requested by the transformation node 631, and return a change notification 632 to the transformation node. In an embodiment, the core node 530 performs the same regardless of whether it receives a request from a service layer or a transformation node 540, and therefore the change notification 632 is returned as if the request had been made by the service layer 520. When it receives change notifications from the core nodes, the transformation node may send a change notification 642 to the service layer. The user interface 510 may then be updated appropriately.

Figure 7:
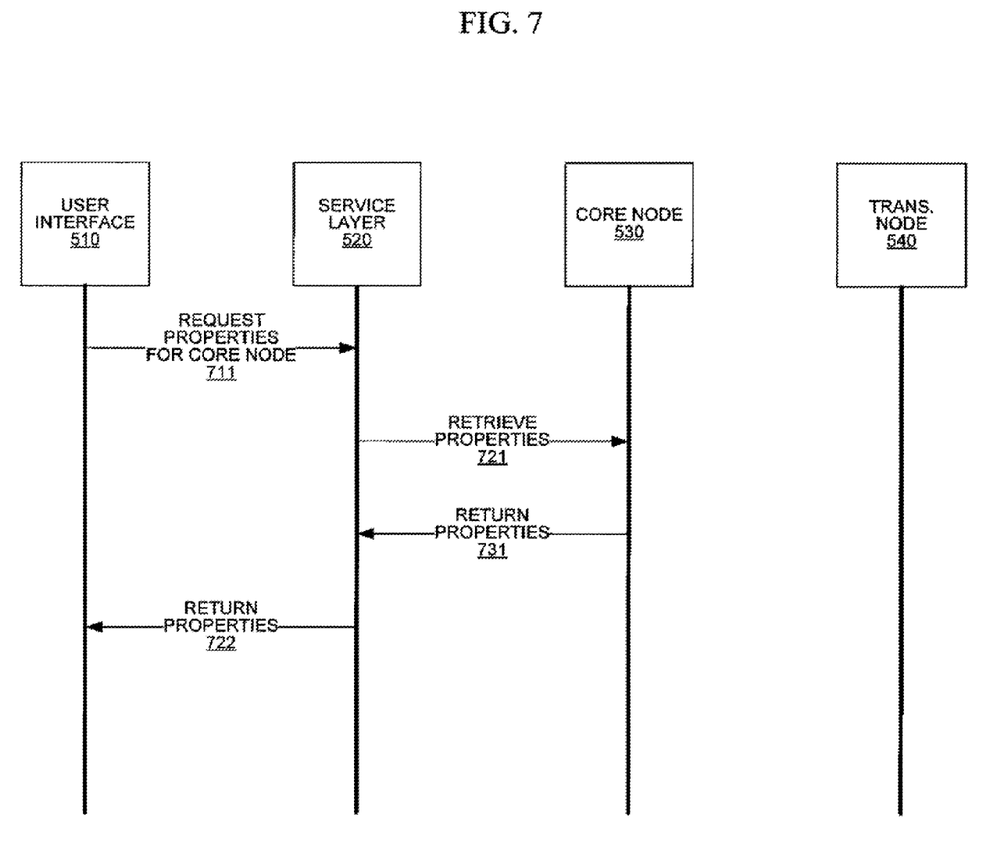
FIG. 7 shows a process for retrieving properties in a system implementing transformation nodes according to an embodiment of the present invention.

Before rendering fields related to services, the user interface must retrieve properties of the fields from the appropriate nodes. The user interface may also retrieve information from nodes to update displayed information after a service has been executed. FIG. 7 shows an exemplary process by which a user interface may retrieve properties from a core node. First the user interface 510 may send a request 711 to the service layer 520. The service layer may determine whether to send the request to a core node 530 or a service node 540. If the request is for properties of a core node 540, the service layer may retrieve properties 721 from the core node. The properties may then be returned 731 to the service layer, and sent from the service layer to the user interface 722. In most cases, no communication between the service layer and transformation nodes will be necessary to retrieve properties of a core node.

Figure 8:
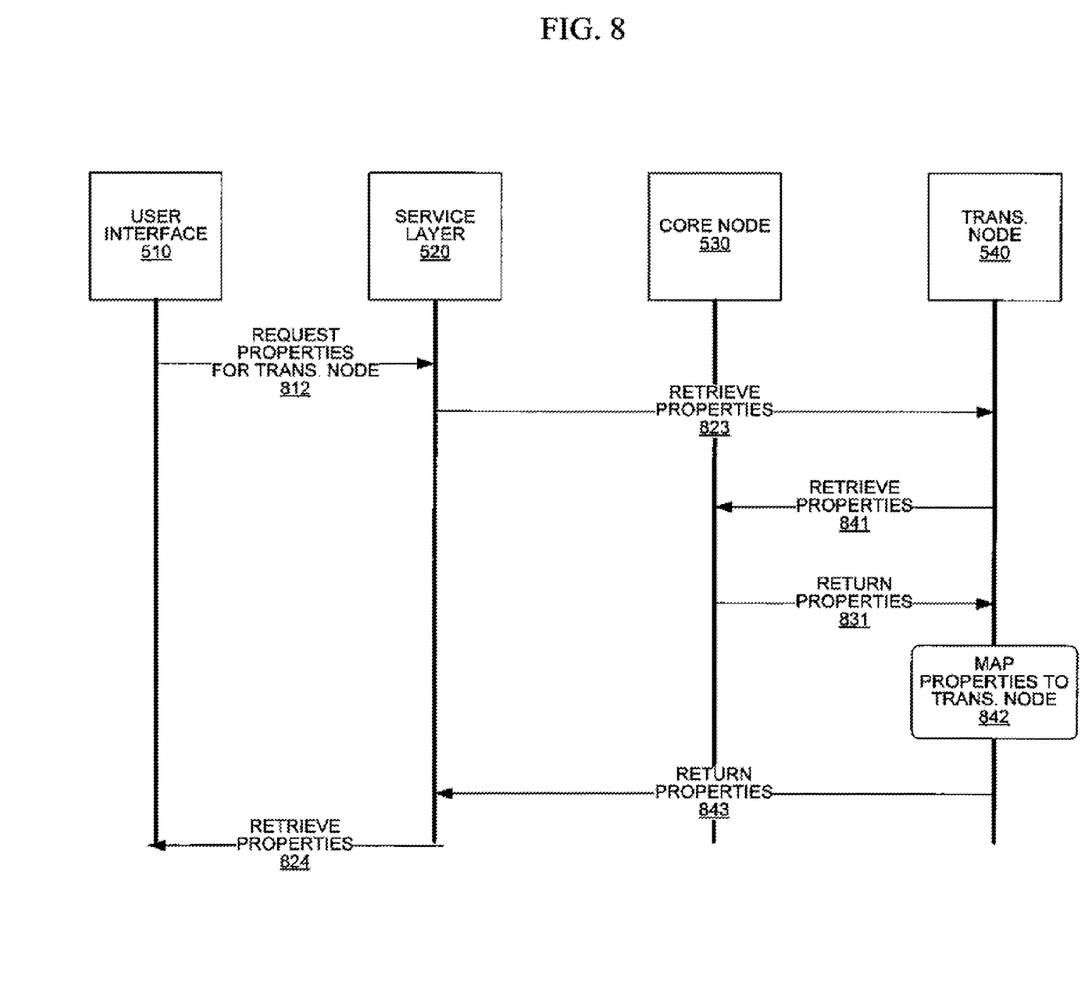
FIG. 8 shows a process for retrieving properties in a system implementing transformation nodes according to an embodiment of the present invention.

To retrieve properties of fields from a transformation node a similar process may be used, as shown in FIG. 8. When a user interface sends a request 812 to the service layer 520, the service layer may send a request 823 to retrieve properties from the appropriate transformation node 540. To maintain consistency among core nodes and transformation nodes, the transformation node may then request 641 and receive 631 related properties of any core nodes on which the transformation node depends. The request 641 sent by the transformation node may be the same as the request that the service layer sends when requesting core node properties, such as the request 711 described above with reference to FIG. 7. When the transformation node receives properties 831 from the core node, it may map those properties to the related fields of the transformation node 842. The properties may then be returned to the service layer 843 and passed on to the user interface 824.

In an embodiment, core nodes, transformation nodes, and their respective service providers within the service layer may be implemented separately. Such separation may reduce or eliminate the potential negative impact of the redundancy introduced by use of a transformation node.

Although the present invention has been described with reference to particular examples and embodiments, it is understood that the present invention is not limited to those examples and embodiments The present invention as claimed therefore includes variations from the specific examples and embodiments described herein, as will be apparent to one of skill in the art.

What is claimed is:

1. A computer-implemented method for executing a service in a computer-based business management system, comprising:

responsive to a first request to generate a first user interface element in a first user interface screen from a model-driven user interface, sending the first request to a core node that includes data to be displayed in the first user interface element and a formatting parameter identifying a presentation format of the displayed data;

generating the first user interface element according to the data and formatting parameters present in the core node;

displaying the first user interface element in the first user interface screen;

responsive to a second request to generate a second user interface element in a second user interface screen linked to the first user interface screen, sending the second request to a node corresponding to the second user interface element, the node being a transformation node that identifies data from another node to be displayed in the second user interface element and a formatting parameter identifying a presentation format of the displayed data;

retrieving data from the core node according to an identifier present in the transformation node;

generating the second user interface element according to data retrieved from the identified core node and formatting parameters retrieved from the transformation node; and displaying the second user interface element in the second user interface screen;

wherein data of the transformation node data is stored without persistency within the data object except for its identified core node.

2. The method of claim 1, wherein the transformation node constructs the second request further based on services exposed by the core node.

3. The method of claim 1, wherein the transformation node is derived from the core node.

4. The method of claim 3, wherein the core node exposes services of the data object presented via a second user interface, the second user interface having a different presentation mode than the first user interface.

5. The method of claim 3, wherein the core node exposes services of the data object presented via a second user interface, the second user interface displaying the same information as the first user interface.

6. The method of claim 1, where the data stored in the core node is a start date, the default format of the data is a numerical date format, and the reformatting instruction comprises a calendar with a clickable date to select the start date.

7. The method of claim 6, where the data stored in the core node is a start date, the default format of the data is a numerical date format, and the reformatting instruction comprises a calendar, the calendar formatted to distinguish the start date from other dates on the calendar.

8. A computer-readable storage medium storing program instructions for execution on at least one processor, which instructions, when executed by the processor, cause the processor to:
   responsive to a first request to generate a first user interface element from a model-driven user interface, send the first request to a core node having a service generating the first user interface element;
   execute the first request in the core node to generate the first user interface element in the model-driven user interface according to the service;
   responsive to a second request to generate an alternative user interface element in the model-driven user interface, the alternative user interface element redundantly presenting data of the first user interface element in a second user interface element in an alternative presentation format in a linked screen, send the second request to a transformation node associated with the core node, the transformation node containing an instruction for generating the alternative user interface element;
   execute the second request in the transformation node to generate the alternative user interface element;
   redundantly present the data of the first user interface element in the second user interface element in the alternative presentation format according to the instruction in the transformation node;
   display the second user interface element;
   responsive to an update of the first user interface element, re-execute the second request in the transformation node to maintain data consistency between the data displayed in the first user interface element and the second user interface element,
   wherein the transformation node data is stored without persistency within the data object.

9. The computer-readable storage medium of claim 8, wherein the transformation node constructs the second request further based on services exposed by the core node.

10. The computer-readable storage medium of claim 8, wherein the core node exposes services of the data object presented via a second user interface, the second user interface having a different presentation mode than the first user interface.

11. The computer-readable storage medium of claim 8, wherein the transformation node is derived from the core node.

12. The computer-readable storage medium of claim 11, wherein the core node exposes services of the data object presented via a second user interface, the second user interface displaying the same information as the first user interface.

13. A computer-implemented method for accessing computer services, comprising:
   responsive to a request for services relating to linked user interface screens entered by a user via a user interface, accessing a data object referenced by the user request, the data object:
   defining services available for the object,
   storing data of the data object, and
   defining data formats of the stored data,
   the data object storing the data, service definitions and format definitions in a hierarchical data structure in which each node of the data object identifies available services, data and data formats available at each user interface screen;
   the data object further comprising a core node containing default services, data, and data formats available at the selected user interface screen and at least one transformation node containing transformation services and transformation data formats for redundantly displaying data stored in the core node of the linked user interface screens in an alternative presentation format to the data format specified in the core node;
   when the user request addresses a transformation node of the data object:
   retrieving the transformation services and transformation data formats of the transformation node;
   executing at least one of the transformation services or transformation data formats on at least one of the default services or data formats of the core node of the linked user interface screens on the stored data of said core node to generate the alternative presentation format; and
   displaying a user interface screen that includes the stored data of the core node of the selected user interface screen:
      presented in a first screen according to at least one of the services or formats of said core node; and
      presented redundantly in the alternative presentation format in another linked screen.

* * * * *